(12) United States Patent
Russell et al.

(10) Patent No.: US 6,990,282 B2
(45) Date of Patent: Jan. 24, 2006

(54) PHOTONIC CRYSTAL FIBERS

(75) Inventors: Philip St. John Russell, Bath (GB);
Timothy Adam Birks, Bath (GB);
Jonathan Cave Knight, Bath (GB);
Brian Joseph Mangan, Bath (GB)

(73) Assignee: Crystal Fibre A/S, Birkerod (DK)

( * ) Notice: Subject to any disclaimer, the term of this patent is extended or adjusted under 35 U.S.C. 154(b) by 245 days.

(21) Appl. No.: 10/149,507

(22) PCT Filed: Dec. 11, 2000

(86) PCT No.: PCT/GB00/04744

§ 371 (c)(1),
(2), (4) Date: Oct. 1, 2002

(87) PCT Pub. No.: WO01/42829

PCT Pub. Date: Jun. 14, 2001

(65) Prior Publication Data

US 2003/0059185 A1    Mar. 27, 2003

(30) Foreign Application Priority Data

Dec. 10, 1999 (GB) .................................. 9929344

(51) Int. Cl.
*G02B 6/02* (2006.01)
*G02B 6/20* (2006.01)
*G02B 6/16* (2006.01)
*G02B 6/18* (2006.01)

(52) U.S. Cl. ........................ 385/125; 385/123; 385/124
(58) Field of Classification Search ......... 385/123–128
See application file for complete search history.

(56) References Cited

U.S. PATENT DOCUMENTS

| | | | |
|---|---|---|---|
| 3,902,879 A | 9/1975 | Siegmund | |
| 5,155,792 A | 10/1992 | Vali et al. | |
| 5,802,236 A | 9/1998 | DiGiovanni et al. | |
| 6,097,870 A | 8/2000 | Ranka et al. | |
| 6,301,420 B1 | 10/2001 | Greenaway et al. | |
| 6,334,019 B1 * | 12/2001 | Birks et al. ................. | 385/125 |

FOREIGN PATENT DOCUMENTS

| | | |
|---|---|---|
| DE | 196 34 893 A1 | 5/1997 |
| EP | 0 859247 A2 | 8/1998 |
| EP | 0 905 834 A2 | 3/1999 |
| EP | 0 918 382 A2 | 5/1999 |

(Continued)

OTHER PUBLICATIONS

Bennett, P.J. et al., "Toward Practial Holey Fiber Technology: Fabrication, Splicing, Modeling, and Characterization," *Optics Letters*, 24(17), pp. 1203-1205 & Figs. 1 and 2 (Sep. 1, 1999).

(Continued)

*Primary Examiner*—Akm Enayet Ullah
*Assistant Examiner*—Kevin S. Wood
(74) *Attorney, Agent, or Firm*—Buchanan Ingersoll PC

(57) ABSTRACT

A photonic crystal fiber comprising a bulk material having an arrangement of longitudinal holes, the fiber including a cladding region and a guiding core (280), the cladding region having an effective-refractive-index which varies across the fiber's cross section, wherein, in use, the effective-refractive-index variation causes light propagating in the fiber to have a different transverse profile from the profile that it would have if the cladding region were of a substantially uniform effective refractive index.

22 Claims, 7 Drawing Sheets

FOREIGN PATENT DOCUMENTS

| | | |
|---|---|---|
| EP | 1 128 194 A2 | 8/2001 |
| WO | WO 99/00685 A1 | 1/1999 |
| WO | WO 99/49340 | 9/1999 |
| WO | WO 99/49341 | 9/1999 |
| WO | WO 99/49342 | 9/1999 |
| WO | WO 00/06506 | 2/2000 |
| WO | WO 00/49435 | 8/2000 |
| WO | WO 00/49436 | 8/2000 |
| WO | WO 00/51268 | 8/2000 |
| WO | WO 00/51269 | 8/2000 |
| WO | WO 00/77549 A1 | 12/2000 |
| WO | WO 01/96919 A1 | 12/2001 |

OTHER PUBLICATIONS

Blanchard, P.M. et al., "Two-Dimensional Bend Sensing With a Single, Multi-Core Optical Fibre," *Smart Materials and Structures*, 9(2), pp. 132-140 (Apr. 2000).

Cregan, R. F. et la., "Single-Mode Photonic Band Gap Guidance of Light In Air," *Science, US, AAAS*, 285(5433), pp. 1537-1539 (Sep. 3, 1999).

Gander, M.J. et al., "Measurement of the Wavelength Dependence of Beam Divergence for Phototonic Crystal Fiber," *Optics Letters*, 24(15), pp. 1017-1019 (Aug. 1, 1999).

Knight, J.C. et al., "Pure Silica Single-Mode Fibre with Hexagonal Phototonic Crystal Cladding," *OFC '96, Post Deadline Paper, PD3*, pp. 1-5 (Feb. 29, 1996).

Knight, J.C. et al., "All-Silica Single-Mode Optical Fiber with Phototonic Crystal Cladding," *Optics Letter*, 21(19), pp. 1547-1549 (Oct. 1, 1996).

Knight, J.C. et al., "Multicore Phototonic Crystal Fibres," $12^{th}$ *International Conference on Optical Fibre Sensors, Technical Digest*, pp. 670-673 (Oct. 1997).

Knight, J.C. et al., "Phototonic Band Gap Guidance in Optical Fibres," *Science*, 282, pp. 1476-1478 (Nov. 20, 1998).

Monro, T. M. et al., "Developing Holey Fibres for Evanescent Field Devices," *Electronic Letters*, 35(14), pp. 1188-1189 (Jul. 8, 1999).

Ortigosa-Blanch, A. et al., "Highly Birefringement Phototonic Crystal Fibers," *Optics Letters*, 25(18), pp. 1325-1327 (Sep. 15, 2000).

Romanova, E.A. et al., "Wave Propagation Through All-Dielectric Multilayered Optical Fiber," $2^{nd}$ *International Conference on Transparent Optical Networks*, Poland, Jun. 5-8, 2000, Conference Proceedings, pp. 57-60.

\* cited by examiner 5 (a)
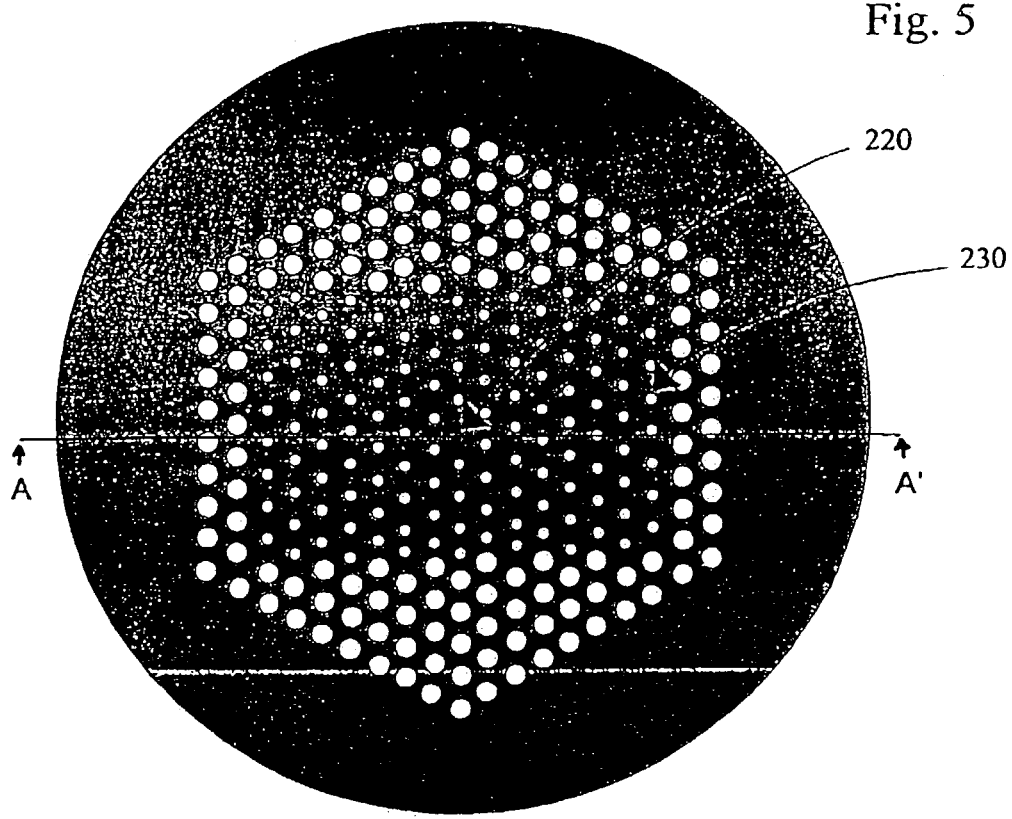
Fig. 5
5 (b)
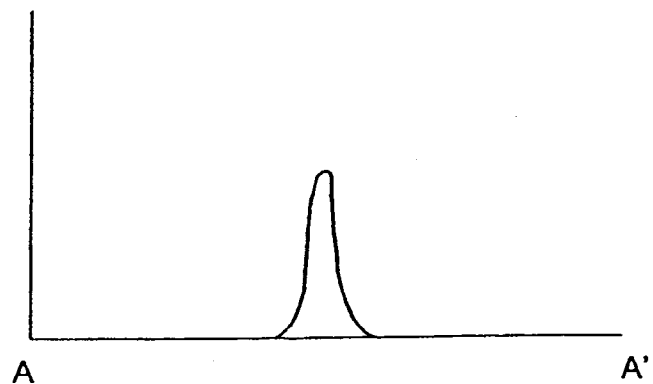
5 (c)
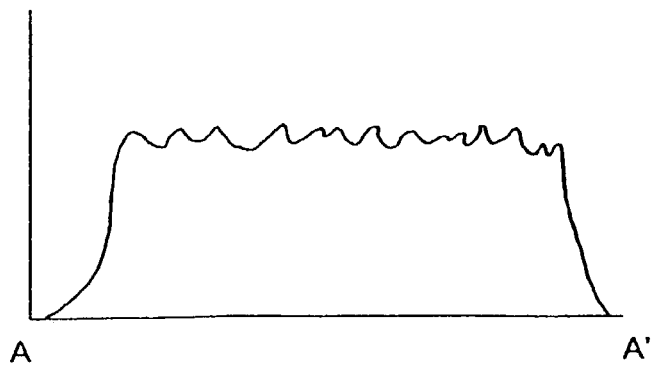

PHOTONIC CRYSTAL FIBERS

This invention relates to photonic crystal fibres and to a method of producing photonic crystal fibres.

Optical fibres are used in many fields including telecommunications, laser machining and welding, laser beam and power delivery, fibre lasers, sensors and medical diagnostics and surgery. They are typically made entirely from solid transparent materials such as glass and each fibre typically has the same cross-sectional structure along its length. The transparent material in one part (usually the middle) of the cross-section has a higher refractive index than the rest and forms an optical core within which light is guided by total internal reflection. We refer to such a fibre as a standard fibre.

Although the light is confined to the core in a standard fibre, the cladding plays an active part in the waveguiding process because a guided mode will extend some distance into the cladding. The cladding is also important for a relatively new class of fibre devices, know as cladding-pumped fibre lasers and amplifiers. The fibres used in such devices have an inner core, in which signal light propagates single-mode, and which is doped with some active material, typically a rare earth element. The inner core is nested in a larger outer core, which is multimode at both signal and pump wavelengths. Typically, the inner core is nested off-centre within the outer core, to improve the overlap between the core mode and the modes of the cladding. High-power multi-mode pump light can be introduced into the outer core with a high efficiency, and propagates down the fibre, being gradually absorbed by the rare earth element present in the inner core. The signal in the inner core is then amplified, forming an optical amplifier or, with appropriate feedback, a laser.

Evanescent fibre sensors and couplers based on standard fibres are known in the form of "D" fibres. The preform from which a "D" fibre is drawn is polished away on one side until the core is close to the surface of the fibre. The fibre is then drawn and the thin layer of cladding glass remaining adjacent to the core in the previously polished region is etched away over a short length of fibre. The evanescent field of light propagating in the fibre is thus readily accessible only over that short length.

In the last few years, a non-standard type of optical fibre has been demonstrated, called the photonic-crystal fibre (PCF). Typically, this is made from a single solid, and substantially transparent, material within which is embedded a periodic array of air holes, running parallel to the fibre axis and extending the full length of the fibre. A defect in the form of a single missing air hole within the regular array forms a region of raised refractive index within which light is guided, in a manner analogous to total-internal-reflection guiding in standard fibres. The effective refractive index of each region of the fibre may be calculated using the methods outlined in, for example, Birks et al, Opt. Lett 22 961 (1997). Another mechanism for guiding light is based on photonic-band-gap effects rather than total internal reflection. Photonic-band-gap guidance can be obtained by suitable design of the array of air holes (see, for example, Birks et al, Electron. Lett. 31 1941 (1995)). Light with particular propagation constants can be confined to the core and will propagate therein.

Photonic-crystal fibre can be fabricated by stacking, on a macroscopic scale, glass canes—some of which are capillaries—into the required shape and then holding them in place while fusing them together and drawing them down into a fibre. PCF has unusual properties such as the ability to guide light in a single-mode over a very broad range of wavelengths, and to guide light having a relatively large mode area which remains single-mode.

A known photonic crystal fibre has several spaced-apart waveguiding cores.

It is an object of the invention to provide photonic crystal fibres having internal structures which enhance the existing functionality of, and/or introduce new functionality to, the fibre.

According to the invention there is provided a photonic crystal fibre comprising a bulk material having an arrangement of longitudinal holes, the fibre including a cladding region and a guiding core, the cladding region having an effective refractive index which varies across the fibre's cross-section, wherein, in use, the effective-refractive-index variation causes light propagating in the fibre to have a different transverse profile from the profile that it would have if the cladding region were of a substantially uniform effective refractive index.

Thus, for example, the shape of the holes, their size, and/or the material which surrounds them or which they contain can vary across the cross-section of the fibre to create effective refractive-index variations which can introduce new functionality into the fibre cladding. Such structures can be introduced, when the fibre is made in the form of a preform, by stacking different capillaries and canes together to form a chosen pattern.

Preferably, the bulk material has a substantially uniform refractive index.

Preferably, the fibre is capable of supporting a fundamental transverse mode, which is substantially confined to the guiding core and at least one other transverse mode, which is less confined to the guiding core than the fundamental mode, the effective refractive-index variation causing the other mode and/or a superposition of modes to have a different profile from the profile it or they would have if the cladding region were of a substantially uniform refractive index. Preferably, the effective-refractive index variation has a very much smaller effect on the fundamental mode than it has on the other mode or on the superposition of modes.

Preferably, the effective-refractive-index variation defines an inner portion of the cladding which acts as an outer core and surrounds the guiding core. Advantageously, light propagating in the other mode or the superposition of modes is guided by the outer core.

Advantageously, the outer core is arranged so that the other mode or the superposition of modes substantially matches the transverse profile of light coupled into the fibre from an external source such as, for example, a laser. The external source may be a diode laser with an output-beam profile which is not circularly symmetric. More efficient coupling into the fibre can be achieved if the transverse profile of the beam which the fibre will guide matches the transverse profile of the beam being coupled into it. Preferably, the guiding core is arranged so that light, at a signal wavelength, propagating in the guiding core overlaps the location of a maximum in the light coupled from the diode laser. A good overlap between pump light and signal light will, in general, lead to efficient transfer of energy between them.

Preferably, light at a signal wavelength is amplified as it propagates. A laser or an amplifier may incorporate a photonic crystal fibre according to any of the above-described aspects of the invention. A fibre Bragg grating may be written onto the guiding core. The present invention also provides a laser incorporating a fibre with such a grating.

Thus, the outer core of a nested-core photonic crystal fibre can be designed to guide light in more than a single mode of propagation, and can be shaped so as to match almost exactly the beam profile of a high-power laser, e.g. a laser diode bar (which will, in general have a non-circularly symmetric beam profile, usually with multiple maxima). The inner core can be arranged to guide radiation in a single mode of operation and to have a significant overlap with the modes of the outer core. The inner core can be doped with some material, typically a rare earth element, which will absorb the pump radiation. Pump radiation may be introduced into the fibre, typically by means of a lens, and will be absorbed by the dopant in the inner core after traversing some length of fibre, typically a few meters. The outer cladding confines the pump radiation and protects it from the external surface of the fibre. The excited dopant in the inner core provides gain for lasing or optical amplification. Feedback into the inner core may be provided, for example, by reflections from the cleaved fibre end-faces or by the use of external mirrors or internal fibre Bragg gratings.

Light in the guiding core can be coupled to a single mode of the outer core by means of bending or twisting of the fibre.

Alternatively, the guiding core may be positioned close to the edge of the cladding region so that, in use, light guided in the guiding core has an evanescent wave which extends to or beyond the edge of the cladding region. Preferably, the cladding region does not completely surround the core. Preferably, the core is surrounded by cladding over 300° or less of its periphery in a plane perpendicular to the longitudinal axis of the fibre and exposed to the fibre's external environment over 60° or more of that periphery. More preferably, the core is surrounded by cladding over 330° or less of that periphery and is exposed to the fibre's external environment over 30° or more of that periphery. The present invention also provides an evanescent sensor or coupler including such a photonic crystal fibre.

The effective-refractive-index variation may form a graded-index structure, which may assist in stripping-off cladding modes. The photonic band-gap of the cladding may be such that the number of possible cladding modes is reduced from the number that would be possible if the cladding region were of a substantially uniform refractive index. Although the overall mode density is not necessarily significantly reduced, there may be a lower number of cladding modes in a given range of propagation constants.

Cladding modes are inevitably excited in the fibre when launching light into the fibre core, and are normally readily removed from the fibre within a few centimeters from the input end. However, one potential application of photonic crystal fibre is as large-mode area fibres for power transmission and high-power lasers and amplifiers. In those applications, removal of cladding modes is more troublesome and is possible only over much longer lengths of fibre. Lower-order cladding modes are excited due to the low numerical aperture (NA) required to efficiently excite the guided mode, and the cladding modes have very small components at the fibre surface. That makes it more difficult to optimise the excitation of the required confined mode. A cladding structure formed using a graded range of hole-size capillaries may increase the rate at which it is possible to remove light trapped in cladding modes by causing the mode profiles of the cladding modes to peak at the edges of the fibre cross-section. Preferably, the graded range of hole sizes is such that the effective refractive index of the cladding region increases from the region adjacent to the core to the outer edge of the cladding. (It should be noted that, in that case, the cladding region does not necessarily have circular symmetry: it may include, for example, a "channel", having a lower refractive index, leading to the surface of the fibre). Likewise, the appearance of photonic band gaps within the cladding structure will decrease the excitation of cladding modes in some circumstances.

The method of fabricating PCFs enables the formation of complex structures, which are difficult or impossible to fabricate in standard fibres. The invention also provides a method of making a photonic crystal fibre as described above.

According to the invention there is also provided a method of producing a photonic crystal fibre, the method comprising the following steps:

(a) forming a stack of canes, at least some of which are capillaries, the stack including canes arranged to form a core region in the fibre and canes arranged to form a cladding region in the fibre; and (b) drawing the stack of canes into a fibre, in which the cladding region has an effective-refractive-index which varies across the fibre's cross-section, wherein the effective-refractive-index variation causes light propagating in the fibre to have a different transverse profile from the profile that it would have if the cladding region were of a substantially uniform refractive index.

Preferably, the effective-refractive-index variation results from the canes arranged to form the cladding including canes of at least two different types. The canes of at least two different types may be, for example, canes which differ in the material from which they are made and/or in their external diameters, and/or canes which are capillaries which differ in the material with which they are filled and/or in their internal diameters.

The effective-refractive-index variation may be created during the drawing process, for example, by pressurisation and/or evacuation of at least some of the holes.

According to the invention there is also provided a method of producing a photonic crystal fibre, the method comprising the following steps:

(a) forming a stack of canes, at least some of which are capillaries, the stack including canes arranged to form a core region in the fibre and canes arranged to form a cladding region in the fibre;

(b) drawing the stack of canes into a fibre;

(c) heat-treating the fibre to create a varying effective-refractive index.

Such structures may be formed by the collapse of holes during the heat treatment. Some of the holes might be pressurised to prevent or control collapse.

The present invention also provides an evanescent sensor or coupler including such a photonic crystal fibre.

Also according to the invention there is provided a photonic crystal fibre comprising a bulk material having an arrangement of longitudinal holes, the fibre including a cladding region and a guiding core, in which the guiding core is positioned close to the outer periphery of the cladding region so that, in use, light guided in the guiding core has an evanescent wave which extends to or beyond the edge of the cladding region.

Preferably, the cladding region does not completely surround the core. More preferably, the core is surrounded by cladding over 300° or less of its periphery in a plane perpendicular to the longitudinal axis of the fibre and exposed to the fibre's external environment over 60° or more of that periphery.

The cladding region may comprise a row of holes, of smaller diameter than the other holes in the cladding, leading from the core to the surface of the fibre.

Also according to the invention there is provided an evanescent sensor or an evanescent coupler including such a photonic crystal fibre.

Also according to the invention there is provided a method of producing a photonic crystal fibre, the method comprising the following steps: (a) forming a stack of canes, at least some of which are capillaries, the stack including one or more canes arranged to form a guiding core region in the fibre and canes arranged to form a cladding region in the fibre, the canes arranged to form the guiding core being arranged close to the outer periphery of the canes arranged to form the cladding region; and (b) drawing the stack of canes into a fibre.

Also according to the invention there is provided a photonic crystal fibre having an arrangement of longitudinal holes, the fibre including a cladding region and a guiding core, the cladding region having a band gap at wavevectors corresponding to the wavevectors of cladding modes, whereby the fibre does not support propagation of those cladding modes.

Also according to the invention there is provided use of a fibre, described above as being according to the invention, to guide light.

By way of example only, an embodiment of the invention will now be described, with reference to the accompanying drawings, of which:

FIG. 5a is a schematic diagram of another photonic crystal fibre according to the invention having nested inner and outer cores.

FIG. 5b shows a typical signal profile across the fibre along the line A–A' marked in FIG. 5a.

FIG. 5c shows a typical pump mode profile across the fibre along the line A–A' marked in FIG. 5a.

FIG. 6 is a schematic diagram of a cladding-pumped fibre laser system incorporating a fibre such as that of FIG. 5a.

Figure 1:
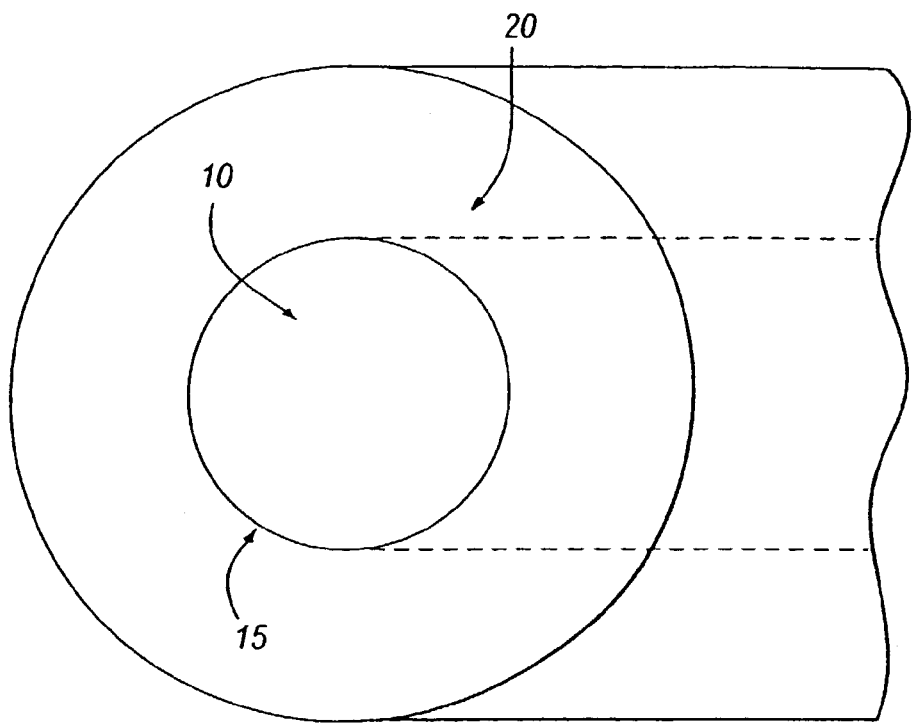
FIG. 1 is a schematic diagram of an example of a standard fibre.

Standard fibres, such as the example shown in FIG. 1, in their simplest form comprise essentially a cylindrical core 10 and concentric cylindrical cladding 20. Typically, both the core and the cladding will be made of the same material, usually silica, but each is doped with other materials in order to raise the refractive index of the core 10 and lower the refractive index of the cladding 20. Light, of appropriate wavelengths, is confined to the core 10, and guided therein, by total internal reflection at the core-cladding boundary 15.

Figure 2:
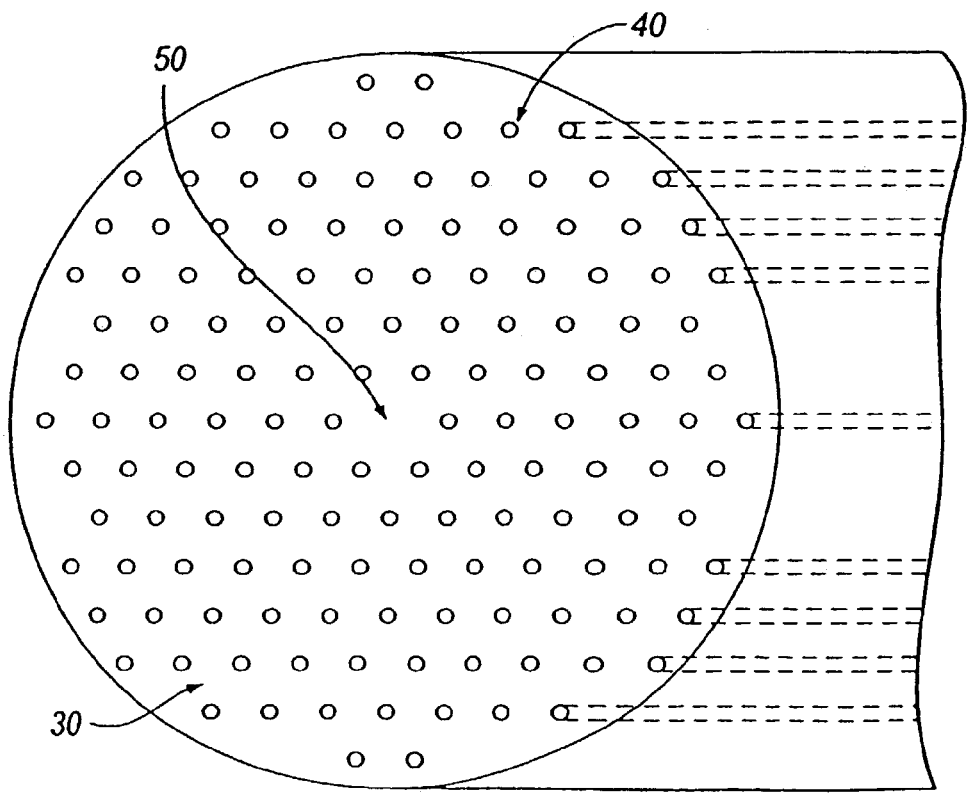
FIG. 2 is a schematic diagram of a conventional photonic-crystal fibre having a high-index core defect.

A typical photonic crystal fibre, shown in FIG. 2, comprises a cylinder of transparent bulk material 30 (e.g. silica) with a-lattice of cylindrical holes 40, which run along its length. The holes are arranged at the vertices and centres of regular hexagons, which have six-fold rotational symmetry. The holes have a regular period, broken by the omission of one hole near the centre of the fibre. The region 50 of the fibre surrounding the site of the missing hole has the refractive index of the bulk material 30. The refractive index of the remainder of the fibre is attributable to the refractive index of both the bulk material 30 and the air in the holes 40. The refractive index of air is lower than that of, for example, silica and, consequently, the 'effective refractive index' of the material with the holes is lower than that of the region 50 surrounding the missing hole. The fibre can therefore confine light approximately to the region 50, in a manner analogous to waveguiding by total internal reflection in standard fibres. The region 50 is therefore referred to as the 'core' of the photonic crystal fibre.

Figure 3:
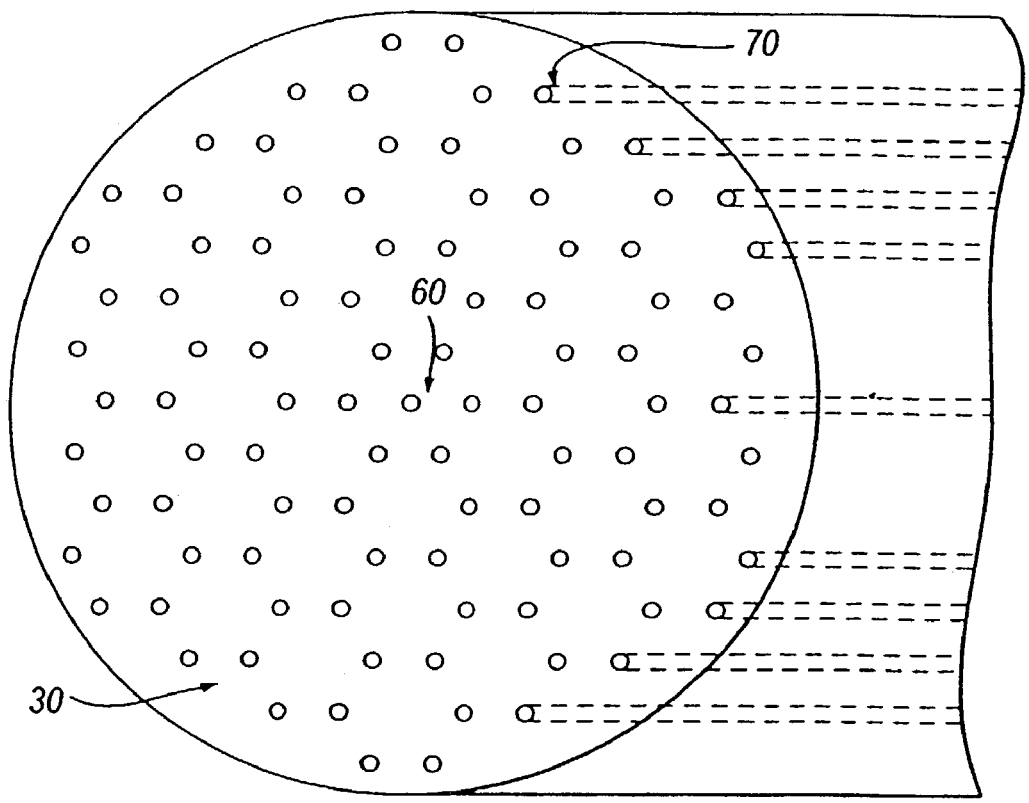
FIG. 3 is a schematic diagram of a conventional photonic-crystal fibre (a photonic-band-gap fibre) having a low-index core defect.

In another form of photonic crystal fibre, photonic band gap guidance acts to confine light to the fibre 'core'. In the example of such a fibre shown in FIG. 3, there is a matrix of holes 70 in bulk material 30. The holes are arranged at the vertices (but not the centres, cf. FIG. 2) of regular hexagons, which have six-fold rotational symmetry. The regularity of the matrix is again broken by a defect, but it is, in the illustrated example, an additional hole 60 at the centre of one of the lattice hexagons, that hexagon being near the centre of the fibre. The area surrounding the additional hole 60 can again be referred to as the core of the fibre. Disregarding (for the moment) hole 60, the periodicity of holes in the fibre results in there being a band-gap in the propagation constants of light which can propagate in the fibre. The addition of hole 60 effectively creates a region with a different periodicity, and that region can support propagation constants different from those supported in the rest of the fibre. If some of the propagation constants supported in the region of hole 60 fall within the band-gap of propagation constants forbidden in the rest of the fibre then light with those propagation constants will be confined to the core and propagate therein. Note that because the hole 60 is a low-index defect (it results in air being where bulk material would otherwise be), total internal reflection effects are not responsible for that waveguiding in the illustrated example.

Figure 4:
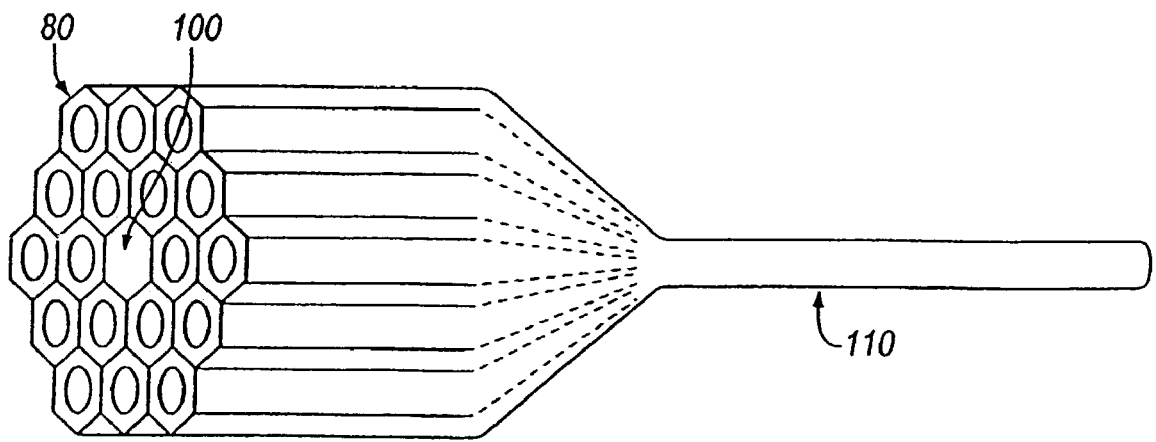
FIG. 4 is a schematic diagram of a photonic-crystal-fibre preform which has been partially drawn into a fibre.

Photonic crystal fibres can be manufactured by a process, one stage of which is shown in FIG. 4. In the first stages of that process (not shown), a cylinder of bulk material (e.g. silica), is milled so that it has a hexagonal cross-section, and a hole is drilled along its centre. The rod is then drawn into a cane using a fibre drawing tower. The cane is cut into lengths and the resulting, short canes 80 are stacked to form an array of canes, as shown in FIG. 4. The cane 100 at the centre of the illustrated array is not a capillary; i.e., it has no hole; the illustrated array will form an effective-index guidance type of fibre. The array of canes 80 is fused together and then drawn into the final photonic crystal fibre 110.

Refractive-index structures can be created, in a photonic crystal fibre according to the invention, by varying, for example, the thickness of the walls of some of the capillaries, or by filling some of the capillaries with a material other than air, or by replacing some of the canes 80 with canes of a different material or by any other suitable variation in the array of canes. The structures could also be created by, for example, selective pressurisation or evacuation of some of the canes during the drawing process in order to create capillaries of various diameters. The structures could also be created by, for example, heat treatment of the fibre 110 after it has been fabricated.

FIG. 5a shows a cladding-pumped photonic crystal fibre in which the signal mode is tightly confined to a doped central defect, 220 (FIG. 5b), giving single-mode lasing with a good overlap between the signal mode and the active doping material. The pump light is trapped in a much larger inner cladding region 230, of rectangular cross-section (FIG. 5c), which is highly multi-mode. The inner cladding region 230 has a very much larger area than the doped core 220, which is contained with it. The inner cladding region 230 can be efficiently excited with a multi-mode laser pump source, high power levels can be achieved with relatively low intensities due to the large area, and the highly-doped core region 220 can be uniformly pumped over a long length because of the small overlap with the cladding modes.

Pump light is guided in the inner cladding region because that region has a higher effective refractive index than the rest of the cladding because the holes in the inner cladding region are smaller.

Thus a cladding-pumped amplifier arrangement can be created, in which the core is doped with a suitable material, such as a rare-earth element, and light at a pump wavelength is guided in the outer core 210, whilst light at a signal wavelength is guided in the inner core 220.

Figure 6:
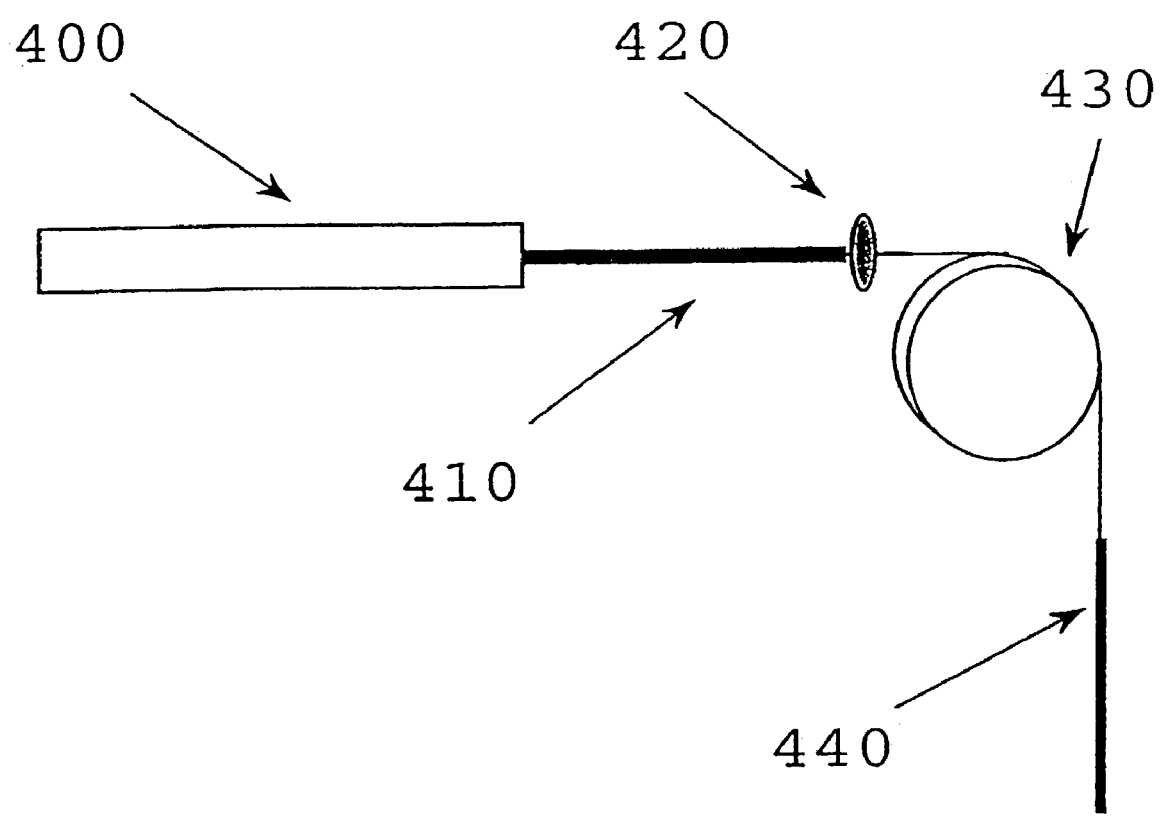

FIG. 6 shows a simple schematic of other elements of a cladding-pumped fibre laser arrangement. Pump laser 400 generates pump light 410 which is coupled into twin-core photonic crystal fibre 430 via lens 420. Feedback in the signal-guiding core is provided, for example, by reflections from the cleaved end-faces of the fibre or by internal fibre Bragg gratings or by external mirrors. When oscillation is achieved, laser radiation 440 at the signal wavelength is output from the fibre.

Figure 7:
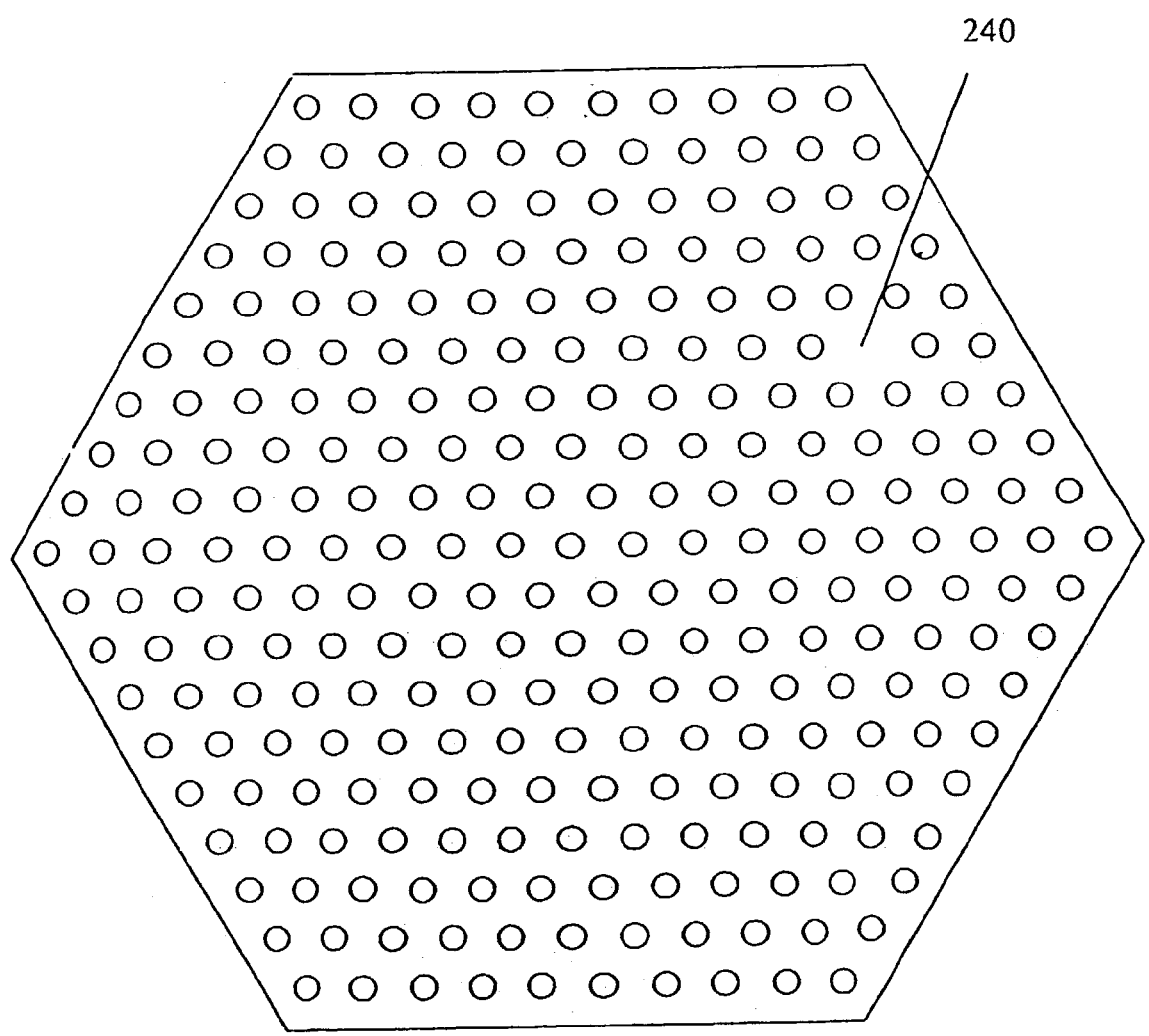
FIG. 7 is a schematic diagram of a photonic-crystal-fibre according to the invention which is suitable for use in an evanescent sensor or coupler.

The photonic crystal fibre of FIG. 7 is suitable for use in an evanescent sensor. (Note, the variation in effective refractive index is not shown in the figure.) The guided mode is trapped in a core 240 near to the external surface of the fibre so that the evanescent tail of the mode extends into the surrounding medium, interacting with that medium by absorption, scattering, or phase shift. Alternatively, a second fibre of the type shown in FIG. 7 could be provided with its core 240 adjacent to the core 240 of the first fibre so that coupling may occur between modes of the two fibres.

Figure 8:
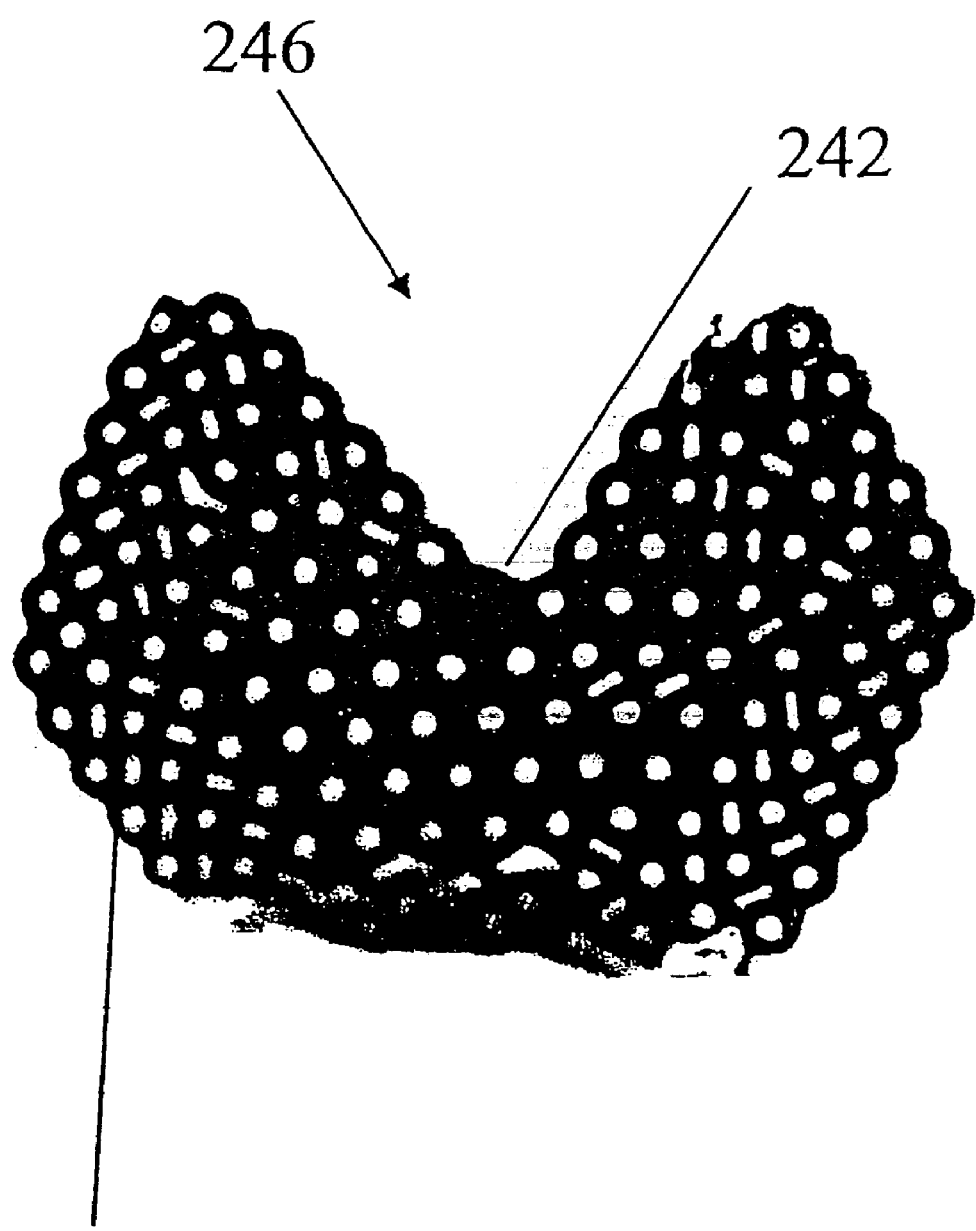
FIG. 8 is an optical micrograph of another photonic-crystal-fibre, according to the invention, which is suitable for use in an evanescent sensor.

The fibre of FIG. 8 would have approximately six-fold rotational symmetry (although some holes in its cladding have been greatly distorted); however, core 242 is surrounded by cladding region 244 over only about 330° of the core's periphery, the core 242 being exposed to the air surrounding the fibre over the remaining 30°; a channel 246 of triangular cross-section is thus formed in cladding 244 along the length of the fibre. This structure has the advantage that the fibre can be handled relatively easily, and the rate at which dust accumulates on the surface is very much reduced in comparison with a "D" fibre Also in contrast to "D" fibres, the core is accessible over the full length of the fibre.

It is surprising that the fibre of FIG. 8 is able to support a guided mode. Very strongly asymmetric structures would be expected usually to lead to at best only leaky mode guidance.

An alternative means to access an evanescent mode of light guided in the photonic crystal fibre would be to provide a structure having a region of higher refractive index in a part of the cladding corresponding to channel 246. An example of such a structure would be a transverse row of holes, of smaller diameter than the other holes in the cladding, leading from the core to the surface of the fibre.

Figure 9:
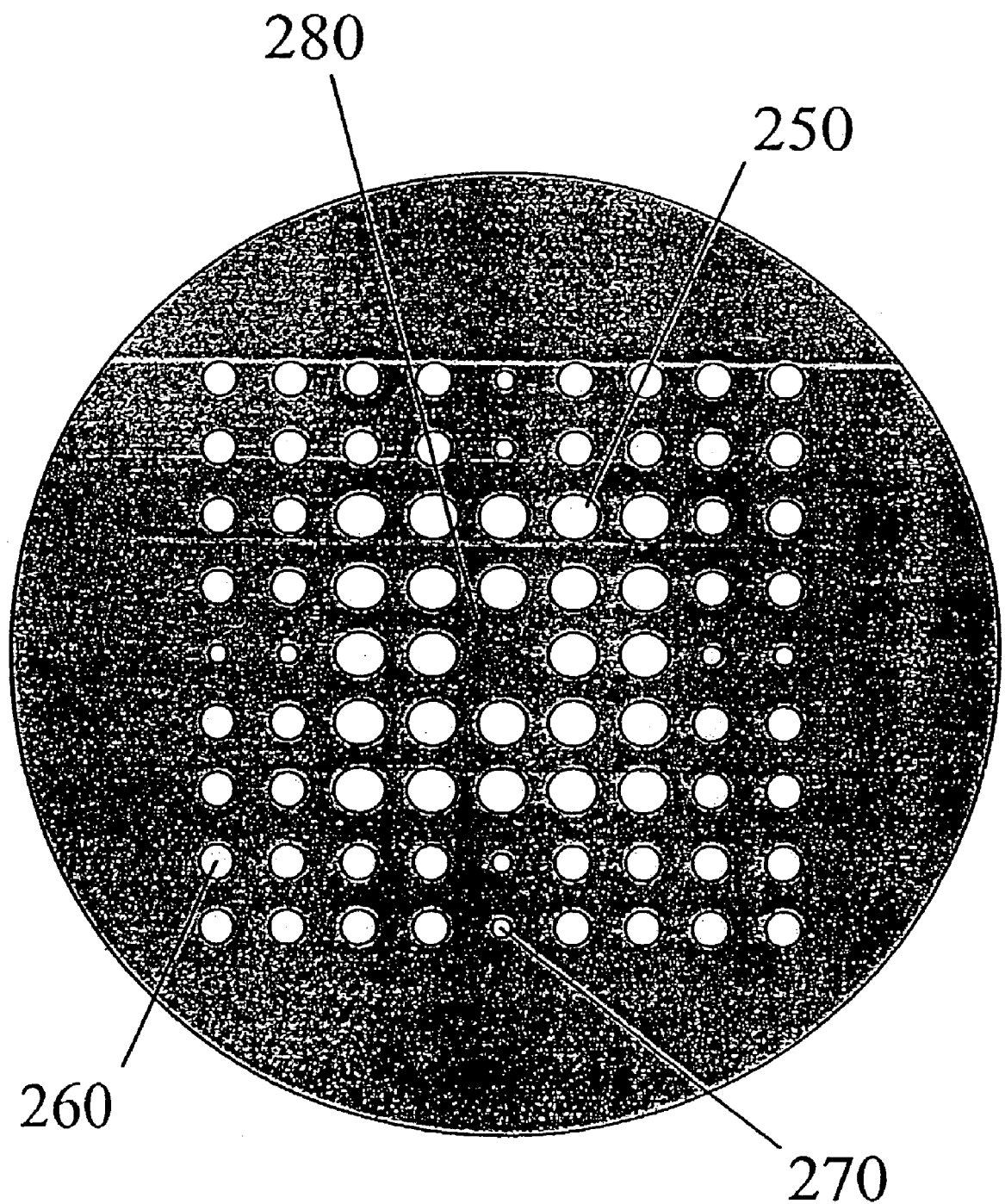
FIG. 9 is a schematic diagram of a photonic-crystal-fibre according to the invention incorporating a graded-index structure for stripping off cladding modes.

The cladding of the photonic crystal fibre of FIG. 9 has a graded index structure which can strip off cladding modes from light guided in the fibre holes 250, 260, 270 of progressively smaller diameter from the central defect 280 outwards. In the Figure are illustrated a square array of twenty-four larger holes 250 and a missing, central air hole; that is, the defect 280. Twenty-four further holes are arranged in a square around the holes 250; of those further holes twenty are of medium size (indicated by reference numeral 260) and four are smaller (indicated by reference numeral 270). Thirty-two further holes are arranged in a square around the other squares, twenty-eight of those holes are the same size as the holes 260 already referred to and are also indicated by that reference numeral, whilst four are smaller and are the same size as holes 270 already referred to and are also indicated by that reference numeral. The eight small holes 270 are arranged in a cross-like pattern centred on the central defect 280.

What is claimed is:

1. A photonic crystal fibre comprising a bulk material having an arrangement of longitudinal holes, the fibre including a cladding region and a guiding core, the cladding region having an effective-refractive-index which varies across the fibre's cross-section, in which the fibre is capable of supporting a fundamental transverse mode, which is substantially confined to the guiding core, and at least one other transverse mode, which is less confined to the guiding core than the fundamental mode, wherein, in use, the effective-refractive-index variation causes light propagating in the fibre to have a different transverse profile from the profile that it would have if the cladding region were of a substantially uniform effective refractive index, and causes the other mode and/or a superposition of modes to have a different profile from the profile it or they would have if the cladding region were of a substantially uniform refractive index.

2. A photonic crystal fibre as claimed in claim 1, which the bulk material has a substantially uniform refractive index.

3. A photonic crystal fibre as claimed in claim 1, in which the effective-refractive-index variation has a very-much-smaller effect on the fundamental mode than it has on the other mode or on the superposition of modes.

4. A photonic crystal fibre as claimed in claim 1, in which the effective-refractive-index variation defines an inner portion of the cladding which forms an outer core and surrounds the guiding core.

5. A photonic crystal fibre as claimed in claim 4, in which light propagating in the other mode or in the superposition of modes is guided by the outer core.

6. A photonic crystal fibre as claimed in claim 5, in which the outer core is arranged so that the other mode or the superposition of modes substantially matches the transverse profile of light coupled into the fibre from an external source.

7. A photonic crystal fibre as claimed in claim 6, which the external source is a laser.

8. A photonic crystal fibre as claimed in claim 7, in which the external source is a diode laser with an output-beam profile which is not circularly symmetric.

9. A photonic crystal fibre as claimed in claim 8, in which the guiding core is arranged so that light, at a signal wavelength, guided by the guiding core overlaps the location of a maximum in the light coupled from the diode laser.

10. A photonic crystal fibre as claimed in claim 1, in which light at a signal wavelength is amplified as it propagates.

11. An amplifier including a photonic crystal fibre according to claim 1.

12. A photonic crystal fibre as claimed in any of claim 1, in which a fibre Bragg grating has been written onto the guiding core.

13. A laser including a photonic crystal fibre according to claim 1.

14. A photonic crystal fibre as claimed in claim 4, in which light in the guiding core can be coupled to a single mode of the outer core by means of bending.

15. A photonic crystal fibre comprising a bulk material having an arrangement of longitudinal holes, the fibre including a cladding region and a guiding core, the cladding region having effective-refractive-index which varies across the fibre's cross-section, wherein, in use, the effective-refractive-index variation causes light propagating in the fibre to have a different transverse profile from the profile that it would have if the cladding region were of a substantially uniform effective refractive index, and in which the guiding core is positioned close to the outer periphery of the cladding region so that, in use, light guided in the guiding core has an evanescent wave which extends to or beyond the edge of the cladding region.

16. A photonic crystal fibre comprising a bulk material having an arrangement of longitudinal holes, the fibre including a cladding region and a guiding core, the cladding region having an effective-refractive-index which varies across the fibre's cross-section, wherein, in use, the effective-refractive-index variation causes light propagating in the fibre to have a different transverse profile from the profile that it would have if the cladding region were of a substantially uniform effective refractive index, and in which the cladding region does not completely surround the core.

17. A photonic crystal fibre as claimed in claim 16, in which the core is surrounded by cladding over less than 300° of its periphery in a plane perpendicular to the longitudinal axis of the fibre and exposed to the fibre's external environment over more than 60° of that periphery.

18. A photonic crystal fibre comprising a bulk material having an arrangement of longitudinal holes, the fibre including a cladding region and a guiding core, the cladding region having an effective-refractive-index which varies across the fibre's cross-section, wherein, in use, the effective-refractive-index variation causes light propagating in the fibre to have a different transverse profile from the profile that it would have if the cladding region were of a substantially uniform effective refractive index, and, in which the cladding region comprises a row of holes, of smaller diameter than the other holes in the cladding, leading from the core to the surface of the fibre.

19. An evanescent sensor including a photonic crystal fibre comprising a bulk material having an arrangement of longitudinal holes, the fibre including a cladding region and a guiding core, the cladding region having an effective-refractive-index which varies across the fibre's cross-section in which light in the guiding core can be coupled to a single mode of the outer core by means of bending, wherein, in use, the effective-refractive-index variation causes light propagating in the fibre to have a different transverse profile from the profile that it would have if the cladding region were of a substantially uniform effective refractive index.

20. An evanescent coupler including a photonic crystal fibre comprising a bulk material having an arrangement of longitudinal holes, the fibre including a cladding region and a guiding core, the cladding region having an effective-refractive-index which varies across the fibre's cross-section in which light in the guiding core can be coupled to a single mode of the outer core by means of bending, wherein, in use, the effective-refractive-index variation causes light propagating in the fibre to have a different transverse profile from the profile that it would have if the cladding region were of a substantially uniform effective refractive index.

21. A photonic crystal fibre comprising a bulk material having an arrangement of longitudinal holes, the fibre including a cladding region and a guiding core, the cladding region having an effective-refractive-index which varies across the fibre's cross-section, wherein, in use, the effective-refractive-index variation causes light propagating in the fibre to have a different transverse profile from the profile that it would have if the cladding region were of a substantially uniform effective refractive index and in which effective-refractive-index variation forms a graded-index structure.

22. A photonic crystal fibre as claimed in claim 21, in which the graded-index structure assists in stripping-off cladding modes.

* * * * *